US012722714B2

(12) United States Patent
Kim et al.

(10) Patent No.: US 12,722,714 B2
(45) Date of Patent: Sep. 1, 2026

(54) FRONT VEHICLE BODY STRUCTURE

(71) Applicants: Hyundai Motor Company, Seoul (KR); Kia Corporation, Seoul (KR)

(72) Inventors: Hyunsik Kim, Seoul (KR); Sehoon Jung, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 388 days.

(21) Appl. No.: 18/370,167

(22) Filed: Sep. 19, 2023

(65) Prior Publication Data

US 2024/0190511 A1 Jun. 13, 2024

(30) Foreign Application Priority Data

Dec. 12, 2022 (KR) ........................ 10-2022-0172990

(51) Int. Cl.
*B62D 25/08* (2006.01)
*B62D 25/14* (2006.01)

(52) U.S. Cl.
CPC ......... *B62D 25/085* (2013.01); *B62D 25/145* (2013.01)

(58) Field of Classification Search
CPC ............................ B62D 25/085; B62D 25/145
See application file for complete search history.

(56) References Cited

U.S. PATENT DOCUMENTS

2020/0047810 A1* 2/2020 Ayukawa .............. B21C 23/002

FOREIGN PATENT DOCUMENTS

CN 115158480 A * 10/2022 ........... B62D 25/085
CN 115384624 A * 11/2022 ........... B62D 25/085

* cited by examiner

*Primary Examiner* — Dany E Akakpo
(74) *Attorney, Agent, or Firm* — MORGAN, LEWIS & BOCKIUS LLP

(57) ABSTRACT

A front vehicle body structure includes a side member disposed on a front of a vehicle body, a lower reinforcement member, a portion of which is provided inside the side member, and a joint bulk head provided inside the side member and connected to a front of the lower reinforcement member.

18 Claims, 13 Drawing Sheets

FRONT VEHICLE BODY STRUCTURE

CROSS-REFERENCE TO RELATED APPLICATION

The present application claims priority to Korean Patent Application No. 10-2022-0172990 filed on Dec. 12, 2022, the entire contents of which is incorporated herein for all purposes by this reference.

BACKGROUND OF THE PRESENT DISCLOSURE

Field of the Present Disclosure

The present disclosure relates to a front vehicle body structure. More particularly, the present disclosure relates to a front vehicle body structure that suppresses separation of a sub-frame in case of vehicle collision.

Description of Related Art

Due to the influence of environmental regulations, research and development on electric vehicles (EVs), rather than internal combustion engines, are increasing.

General electric vehicles have a short front overhang because the space for configuring the Power Electric (PE) room is small, and therefore, the collision space for responding to a front collision is insufficient. In addition, when the battery is positioned under the vehicle body and the vehicle collides, there is a possibility that the rear mounting part of the sub-frame is separated and hits the battery.

That is, the rear mount of the sub-frame is separated during a collision, the sub-frame hits the high voltage battery, and there is a possibility of damage and ignition of the high voltage battery.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a front vehicle body structure that suppresses separation of sub-frames upon vehicle collision.

The present disclosure is directed to providing a front vehicle body structure configured for absorbing collision energy by partially collapsing a side member and inducing bending of a portion of a section when a vehicle collides.

A front vehicle body structure according to various exemplary embodiments of the present disclosure may include a side member disposed on a front of a vehicle body, a lower reinforcement member, a portion of which is provided inside the side member, and a joint bulk head provided inside the side member and connected to a front of the lower reinforcement member.

The front vehicle body structure according to various exemplary embodiments of the present disclosure may further include a sub-frame front mounting portion and a sub-frame rear mounting portion, respectively formed on front and rear of the side member, and wherein the lower reinforcement member may extend from the vicinity of the center position between the sub-frame front mounting portion and the sub-frame rear mounting portion to the rear of the vehicle body.

The front vehicle body structure according to various exemplary embodiments of the present disclosure may further include a rear lower member connecting the rear of the side member and a side sill.

The lower reinforcement member may extend to the side sill.

The lower reinforcement member may be connected to a bottom surface of the side member and a bottom surface of the rear lower member.

The front vehicle body structure according to various exemplary embodiments of the present disclosure may further include a side reinforcement bulk head provided inside the side member and connected to the joint bulk head.

The joint bulk head may include a joint bulk head lower flange connected to the lower reinforcement member, a joint bulk head upper flange connected to the side member, and a joint bulk head side flange formed between the joint bulk head lower flange and the joint bulk head upper flange.

The side reinforcement bulk head may include a side reinforcement bulk head side flange connected to the side member, and a side reinforcement bulk head connecting flange connected to the side member and the joint bulk head side flange.

A section between the front of the side member and a portion provided with the side reinforcement bulk head may form a collapsing deformation zone collapsed when a vehicle collides.

The front of the side reinforcement bulk head and the rear of the joint bulk head may form a first bending section and a second bending section, respectively, which are bent in response that a vehicle collides.

The sub-frame rear mounting portion may include a sub-frame rear mounting portion bracket connected to the rear lower member, and a sub-frame rear mounting bolt provided through the sub-frame rear mounting portion bracket, the rear lower member and the lower reinforcement member.

The sub-frame rear mounting portion may further include a sub-frame rear mounting reinforcement connecting the sub-frame rear mounting portion bracket, the rear lower member and a front floor of the vehicle body.

The front vehicle body structure according to various exemplary embodiments of the present disclosure may further include a side rear bulk head provided adjacent to a connection portion between the side member and the rear lower member.

The sub-frame front mounting portion may include a front mounting bracket, a front side member bracket connecting the front mounting bracket and the side member, and a front side member bulk head provided within the front side member bracket.

According to the front vehicle body structure according to various exemplary embodiments of the present disclosure, it is possible to suppress the separation of the sub-frame upon vehicle collision.

According to the front vehicle body structure according to various exemplary embodiments of the present disclosure, when a vehicle collides, a portion of a side member collapses and induces bending of a partial section to absorb collision energy.

Furthermore, the effects which may be obtained or predicted due to the exemplary embodiments of the present disclosure will be directly or implicitly included in the detailed description of the present disclosure. That is, various effects expected according to various exemplary embodiments of the present disclosure will be included within the detailed description to be described later.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
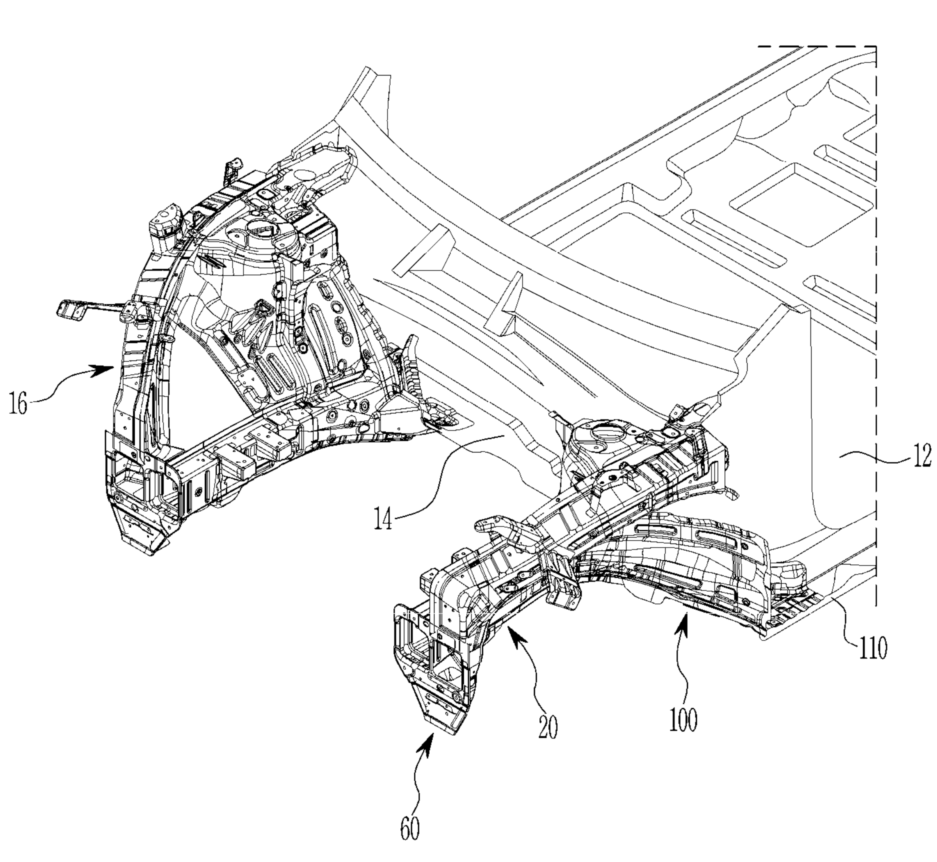
FIG. 1 is a perspective view of a front vehicle body structure according to various exemplary embodiments of the present disclosure.

It may be understood that the appended drawings are not necessarily to scale, presenting a somewhat simplified representation of various features illustrative of the basic principles of the present disclosure. The predetermined design features of the present disclosure as included herein, including, for example, specific dimensions, orientations, locations, and shapes will be determined in part by the particularly intended application and use environment.

In the figures, reference numbers refer to the same or equivalent portions of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Exemplary embodiments of the present disclosure will be described more fully hereinafter with reference to the accompanying drawings, in which exemplary embodiments of the present disclosure are shown.

As those skilled in the art would realize, the described embodiments may be modified in various different ways, all without departing from the spirit or scope of the present disclosure.

To clearly describe the present disclosure, parts irrelevant to the description are omitted, and the same reference numerals are assigned to the same or similar components throughout the specification.

Because the size and thickness of each component shown in the drawings are arbitrarily shown for convenience of description, the present disclosure is not necessarily limited to those shown in the drawings, and the thickness is enlarged to clearly express various portions and regions.

Furthermore, in the detailed description below, the names of the components are classified as first, second, etc., to classify them as the components are the same, and the order is not necessarily limited in the following description.

In the entire specification, when a part is said to contain certain constituent elements, it means that other constituent elements may be included, rather than excluding other constituent elements, unless otherwise specified.

Furthermore, terms such as . . . parts, . . . means described in the specification mean a comprehensive unit that performs at least one function or operation.

When a part such as a layer, film, region, plate, etc. is said to be "on" another part, this includes not only the case directly on the other part, but also the case where there is another part in between.

In contrast, when an element is referred to as being "directly on" another element, there are no intervening elements present.

Various exemplary embodiments of the present disclosure will hereinafter be described in detail with reference to the accompanying drawings.

Figure 2:
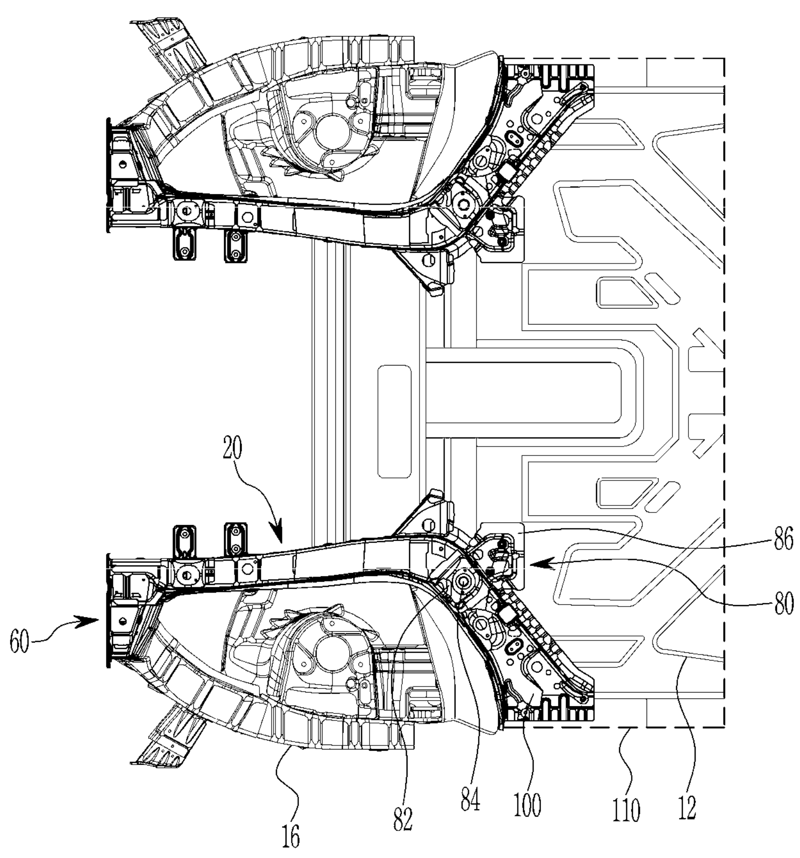
FIG. 2 is a bottom view of a front vehicle body structure according to various exemplary embodiments of the present disclosure.

FIG. 1 is a perspective view of a front vehicle body structure according to various exemplary embodiments of the present disclosure, and FIG. 2 is a bottom view of a front vehicle body structure according to various exemplary embodiments of the present disclosure.

Referring to FIG. 1 and FIG. 2, a vehicle body 10 to which a front vehicle body structure according to various exemplary embodiments of the present disclosure may be applied includes a side member 20 disposed on a front of the vehicle body 10.

The vehicle body 10 may further include a dash panel 14 disposed in front of a cabin, a side sill 110 reinforcing the side of the cabin, and a front floor 12 forming a lower portion of the cabin.

A sub-frame front mounting portion 60 may be connected to the front of the side member 20, and the sub-frame front mounting portion 60 and a side upper member 16 may be connected.

Figure 3:
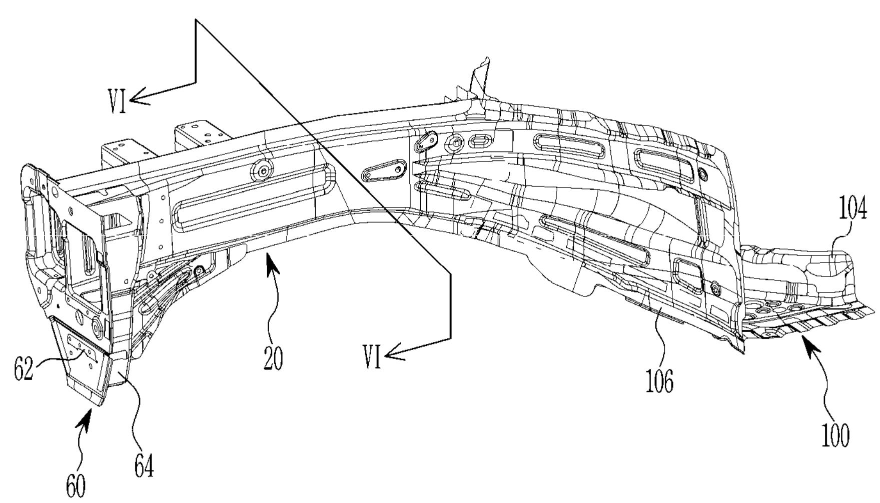
FIG. 3 is a partial perspective view of a front vehicle body structure according to various exemplary embodiments of the present disclosure.
Figure 4:
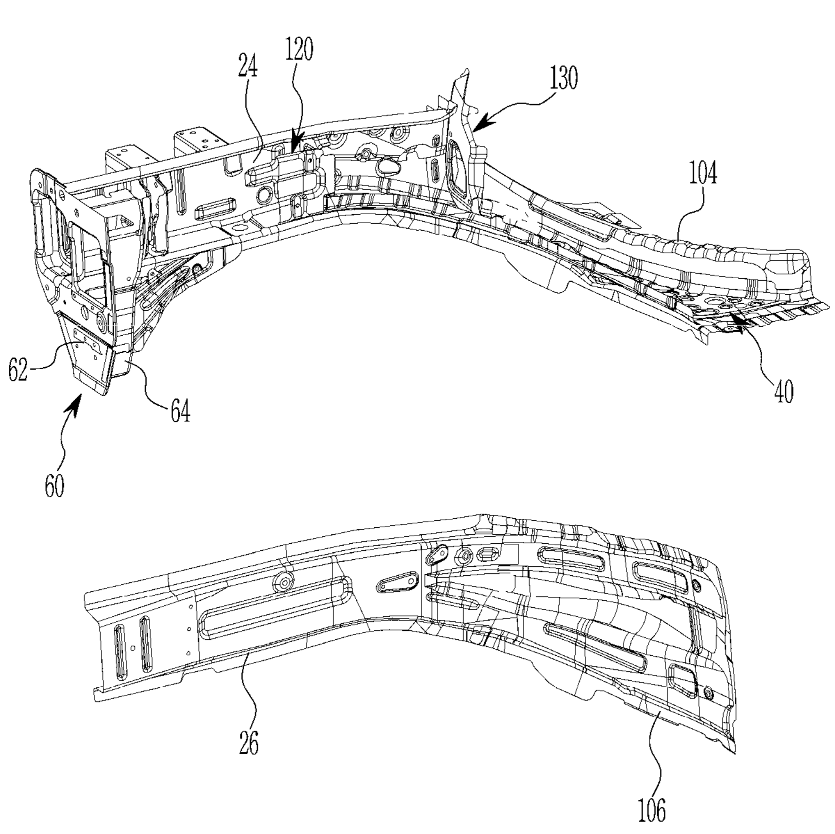
FIG. 4 and FIG. 5 are exploded perspective views of a front vehicle body structure according to various exemplary embodiments of the present disclosure.
Figure 5:
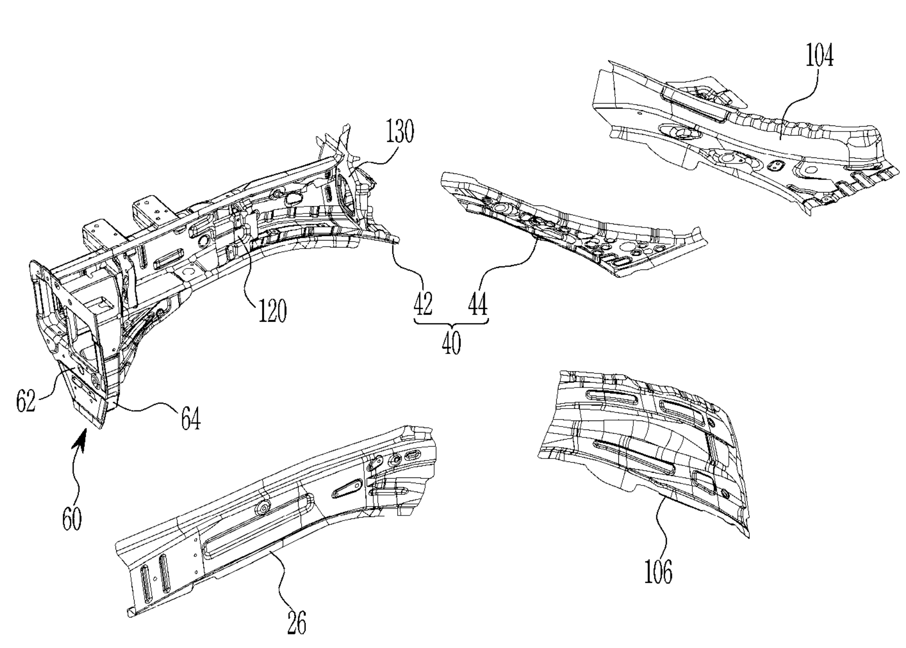

FIG. 3 is a partial perspective view of a front vehicle body structure according to various exemplary embodiments of the present disclosure, and FIG. 4 and FIG. 5 are exploded perspective views of a front vehicle body structure according to various exemplary embodiments of the present disclosure.

Figure 6:
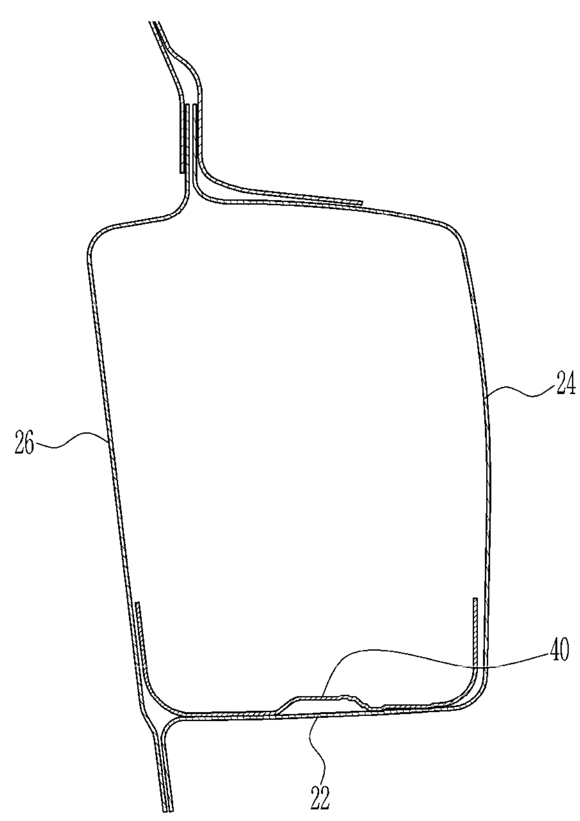
FIG. 6 is a cross-sectional view along the VI-VI line in FIG. 3.
Figure 7:
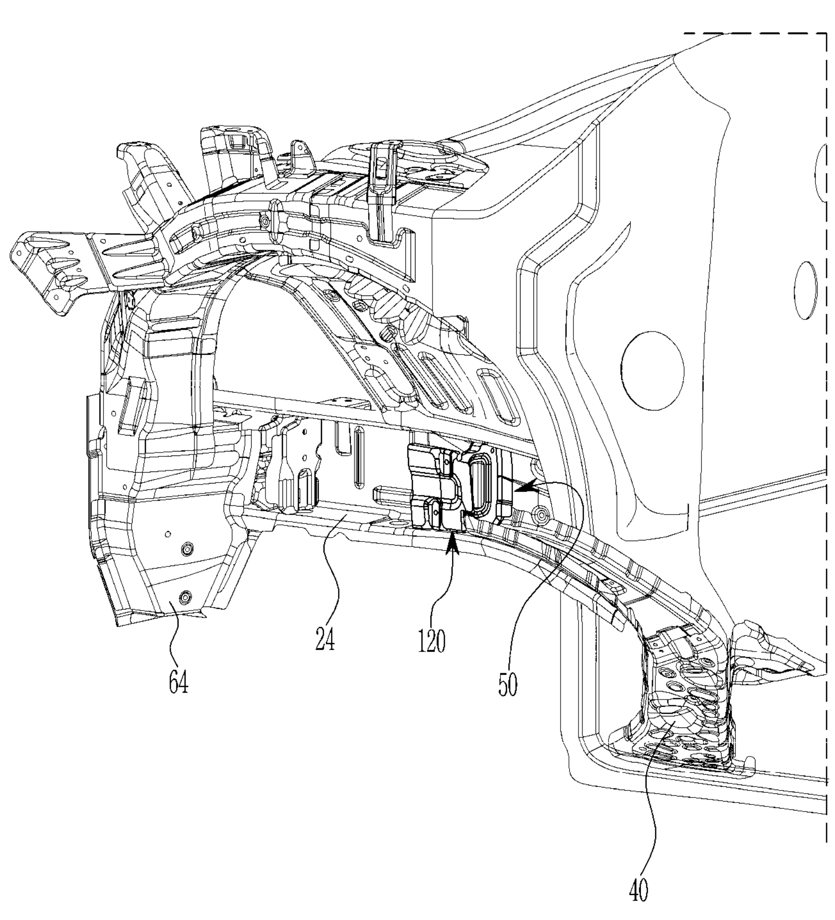
FIG. 7 is a partial side perspective view of a front vehicle body structure according to various exemplary embodiments of the present disclosure.

FIG. 6 is a cross-sectional view along the VI-VI line in FIG. 3, and FIG. 7 is a partial side perspective view of a front vehicle body structure according to various exemplary embodiments of the present disclosure.

Referring to FIG. 1 to FIG. 7, the front vehicle body structure according to various exemplary embodiments of the present disclosure may include the side member 20, a lower reinforcement member 40, a portion of which is provided inside the side member 20, and a joint bulk head 50 provided inside the side member 20 and connected to the front of the lower reinforcement member 40.

In the drawing, the lower reinforcement member 40 is shown in a configuration including a front reinforcement member 42 and a rear reinforcement member 44 coupled with the front reinforcement member 42, but is not limited thereto. That is, it may be a combination of one or three or more.

The side member 20 may include a side member internal panel 24 and a side member external panel 26 connected to the side member internal panel 24. The lower reinforcement member 40 and the joint bulk head 50 may be mounted inside the side member internal panel 24 and the side member external panel 26.

The lower reinforcement member 40 is mounted on the rear of the side member 20 at the position where the joint bulk head 50 is mounted, however a separate or additional reinforcing structure is not applied to the front at the position where the joint bulk head 50 is mounted.

Therefore, the front portion of the position where the joint bulk head 50 is mounted has relatively weak strength compared to the portion where the lower reinforcement member 40 and the joint bulk head 50 are mounted, so it induces collapse in the event of a frontal collision of a vehicle and may absorb the impact of the collision.

The front vehicle body structure according to various exemplary embodiments of the present disclosure further includes a sub-frame front mounting portion 60 and a sub-frame rear mounting portion 80 respectively formed on front and rear of the side member 20, and the lower reinforcement member 40 may extend from the vicinity of the center position between the sub-frame front mounting portion 60 and the sub-frame rear mounting portion 80 to the rear of the vehicle body.

The center position between the sub-frame front mounting portion 60 and the sub-frame rear mounting portion 80 is approximately near to the center position between the front of the side member 20 and the dash panel 14, and the collapsed portion at the time of a frontal collision of the vehicle may be approximately from the front of the side member 20 to the central position between the front of the side member 20 and the dash panel 14.

The front vehicle body structure according to various exemplary embodiments of the present disclosure may further include a rear lower member 100 connecting the rear of the side member 20 and the side sill 110.

The rear lower member 100 is a member that connects the side member 20 and the side sill 110 in the oblique direction of the vehicle body 10, and in case of a frontal collision of the vehicle, the impact load of the side member 20 may be distributed to the dash panel 14 and the side sill 110 through the rear lower member 100.

The rear lower member 100 may cover the dash panel 14 and may extend to the side sill 110 to distribute the collision load of the side member 20 to the dash panel 14 and the side sill 110 when a vehicle front collides.

In the drawing, the rear lower member 100 is shown as including a rear lower member internal panel 104 and a rear lower member external panel 106, but is not limited thereto, and may include one or three or more portions.

The lower reinforcement member 40 may extend to the side sill 110.

The lower reinforcement member 40 is connected to a portion of the side member 20 to increase the structure strength of the side member 20, reinforce the structure strength of the rear lower member 100, and when the front of the vehicle collides, the impact load of the side member 20 may be distributed to the dash panel 14 and the side sill 110 though the lower reinforcement member 40

The lower reinforcement member 40 may be connected to a bottom surface 22 (see FIG. 6) of the side member 20 and a bottom surface 102 (see FIG. 11) of the rear lower member 100.

Therefore, the lower reinforcement member 40 increases the connection force between the side member 20 and the rear lower member 100, and may transmit a crash load to the rear of the vehicle body 10.

The lower reinforcement member 40 includes a "U"-shaped cross-section shape and may reinforce the strength of the side member 20 and the rear lower member 100 and suppress the deformation due to the collision load in the event of a vehicle collision.

The front vehicle body structure according to various exemplary embodiments of the present disclosure may further include a side rear bulk head 130 provided near a connection portion between the side member 20 and the rear lower member 100.

The side rear bulk head 130 may suppress deformation of the side member 20 and the rear lower member 100 when a vehicle collides by increasing strength near to the joint between the side member 20 and the rear lower member 100.

Figure 8:
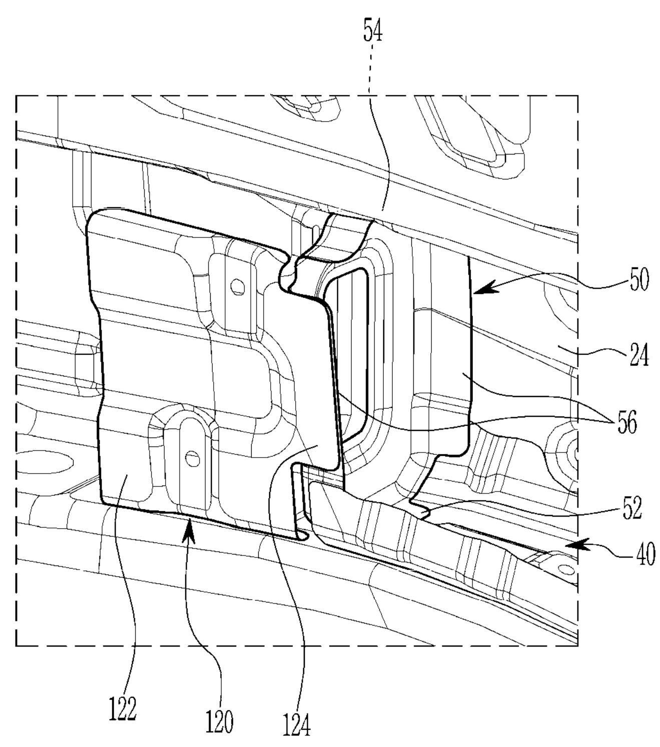
FIG. 8 is a drawing showing a joint bulk head and a side reinforcing bulk head of a front vehicle body structure according to various exemplary embodiments of the present disclosure.

FIG. 8 is a drawing showing a joint bulk head and a side reinforcement bulk head of a front vehicle body structure according to various exemplary embodiments of the present disclosure.

Referring to FIG. 8, the front vehicle body structure according to various exemplary embodiments of the present disclosure may further include a side reinforcement bulk head 120 provided inside the side member 20 and connected to the joint bulk head 50.

The joint bulk head 50 may include a joint bulk head lower flange 52 connected to the lower reinforcement member 40, a joint bulk head upper flange 54 connected to the side member 20, and a joint bulk head side flange 56 formed between the joint bulk head lower flange 52 and the joint bulk head upper flange 54.

Strength of the side member 20 near to the mount position of the joint bulk head 50 is increased by combining the bending shape of each flange 52, 54, and 56 of the joint bulk head 50 and the lower reinforcement member 40 and the side member 20.

The side reinforcement bulk head 120 may include a side reinforcement bulk head side flange 122 connected to the side member 20, and a side reinforcement bulk head connecting flange 124 connected to the side member 20 and the joint bulk head side flange 56.

Referring to FIG. 4, FIG. 5 and FIG. 8, the side reinforcement bulk head side flange 122 is connected to the side member external panel 26 to increase the strength of the side member 20. Furthermore, the side reinforcement bulk head side flange 122 is connected between the side reinforcement bulk head connecting flange 124, the side member 20 and the joint bulk head side flange 56 to increase the strength of the side member 20.

Figure 9:
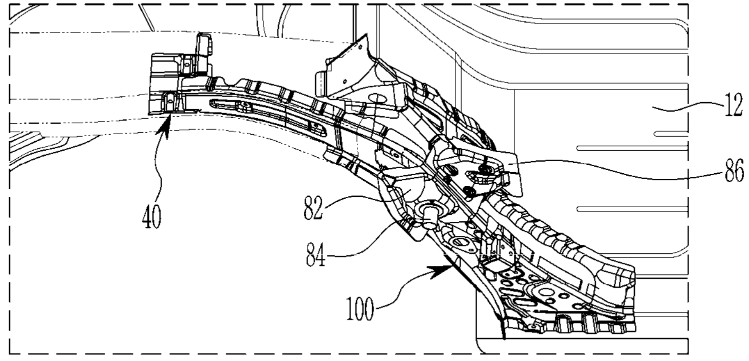
FIG. 9 is a partial lower perspective view of a front vehicle body structure according to various exemplary embodiments of the present disclosure.
Figure 10:
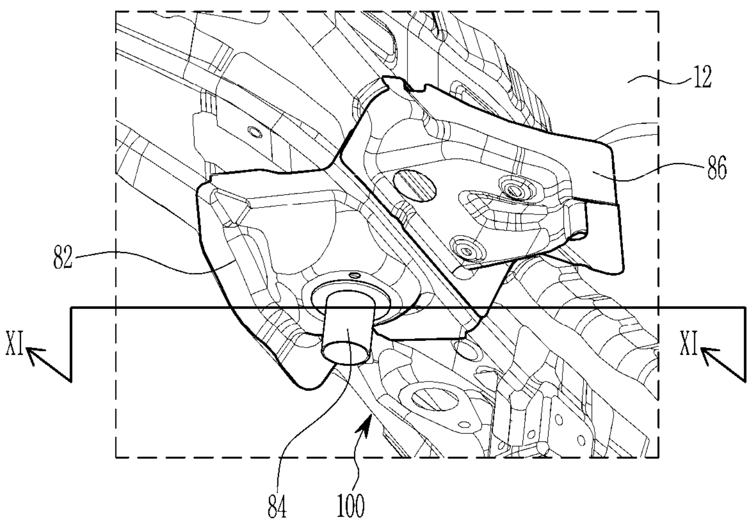
FIG. 10 is a drawing showing a sub-frame rear mounting portion of a front vehicle body structure according to various exemplary embodiments of the present disclosure.
Figure 11:
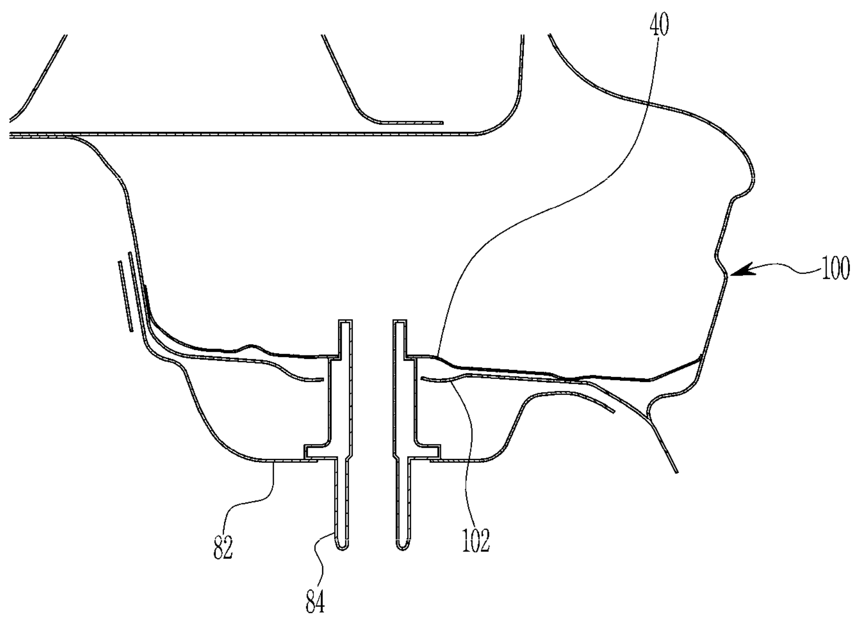
FIG. 11 is a cross-sectional view along line XI-XI in FIG. 10.

FIG. 9 is a partial lower perspective view of a front vehicle body structure according to various exemplary embodiments of the present disclosure, FIG. 10 is a drawing showing a sub-frame rear mounting portion of a front vehicle body structure according to various exemplary embodiments of the present disclosure, and FIG. 11 is a cross-sectional view along line XI-XI in FIG. 10.

Referring to FIG. 9, FIG. 10 and FIG. 11, the sub-frame rear mounting portion 80 may include a sub-frame rear mounting portion bracket 82, which is connected to the rear lower member 100, and a sub-frame rear mounting bolt 84 provided through the sub-frame rear mounting portion bracket 82, the rear lower member 100 and the lower reinforcement member 40.

The sub-frame rear mounting bolt 84 integrally connects the sub-frame rear mounting portion bracket 82, the rear lower member 100 and the lower reinforcement member 40 to increase the bonding strength of the sub-frame rear mounting portion bracket 82, the rear lower member 100 and the lower reinforcement member 40.

The sub-frame rear mounting bolt 84 may be provided through the bottom surface 102 of the rear lower member 100.

The sub-frame rear mounting portion bracket 82, the rear lower member 100 and the lower reinforcement member 40 are integrally connected through the sub-frame rear mounting bolt 84, and thus separation of a sub-frame 140 (see FIG. 13) described later may be suppressed when a vehicle collides.

The sub-frame rear mounting portion 80 may further include a sub-frame rear mounting reinforcement 86 connecting the sub-frame rear mounting portion bracket 82, the rear lower member 100 and the front floor 12 of the vehicle body 10.

Separation of the sub-frame rear mounting portion 80 and the sub-frame 140 may be further suppressed by reinforcing coupling of the sub-frame rear mounting reinforcement 86.

Figure 12:
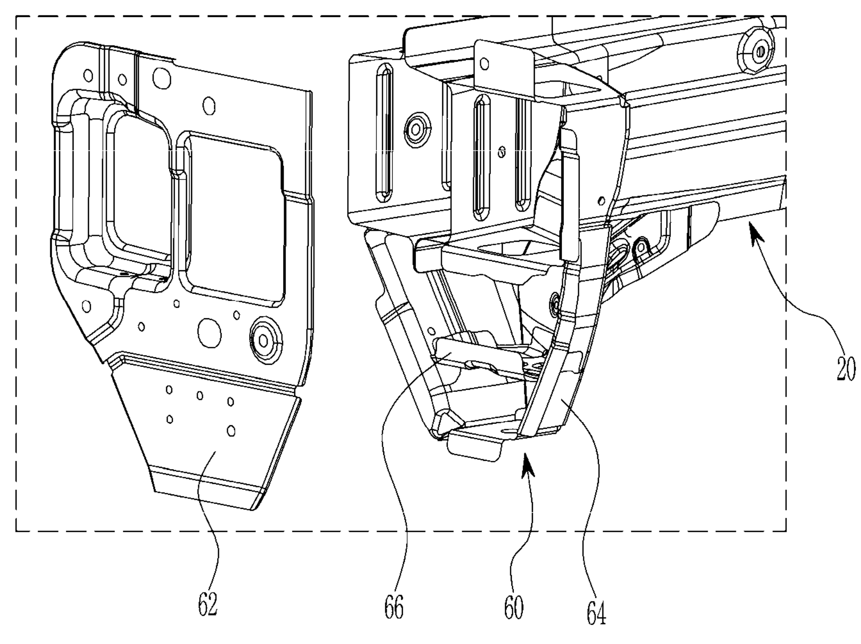
FIG. 12 is an exploded perspective view of a sub-frame front mounting portion of a front vehicle body structure according to various exemplary embodiments of the present disclosure.

FIG. 12 is an exploded perspective view of a sub-frame front mounting portion of a front vehicle body structure according to various exemplary embodiments of the present disclosure.

The sub-frame front mounting portion 60 includes a front mounting bracket 62, a front side member bracket 64 connecting the front mounting bracket 62 and the side member 20, and a front side member bulk head 66 provided in the front side member bracket 64.

The sub-frame 140 may be mounted to the front side member bracket 64 and the front side member bulk head 66 through a connection bolt.

Figure 13:
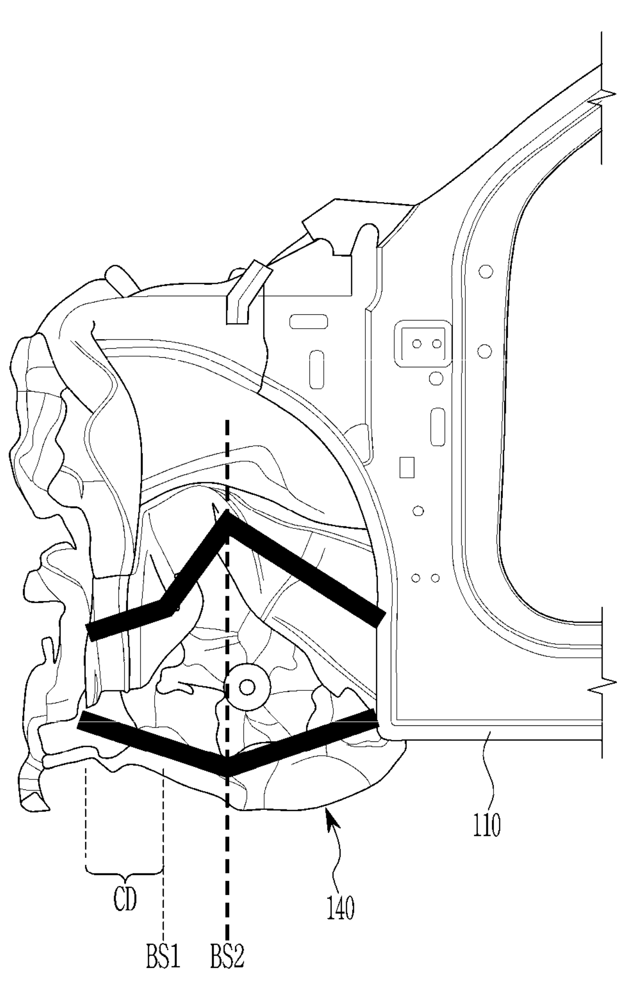
FIG. 13 is a drawing showing deformations of a vehicle body during a front collision of a front vehicle body structure according to various exemplary embodiments of the present disclosure.

FIG. 13 is a drawing showing deformations of a vehicle body during a front collision of a front vehicle body structure according to various exemplary embodiments of the present disclosure.

A section between the front of the side member 20 and a portion provided with the side reinforcement bulk head 120 may form a collapsing deformation zone CD collapsed when a vehicle collides.

The front of the side reinforcement bulk head 120 and the rear of the joint bulk head 50 may form a first bending section BS1 and a second bending section BS2, respectively, which are bent when a vehicle collides.

Because there is no additional reinforcing portion in the section between the front of the side member 20 and the portion where the side reinforcement bulk head 120 is provided, the collapsing deformation zone CD is deformed and can absorb the crash load when the front of the vehicle collides.

In the front and rear sections where the side reinforcement bulk head 120 and the joint bulk head 50 are mounted, the structure cross-section is changed and may be bent when a vehicle collides.

When a vehicle collides, the side member 20 can absorb the impact by bending the first bending section BS1 and the second bending section BS2.

That is, because the cross-section moment rapidly rises at the mount position of the side reinforcement bulk head 120, primary bending occurs, and secondary bending may occur due to a rapid drop in cross-section moment at the rear end portion of the joint bulk head 50.

The predicted position of deformation of the sub-frame 140 upon a vehicle collision may be predicted by experimentation, and the position of the second bending section BS2, that is, the mounting position of the joint bulk head 50 may be set according to the expected deformation position of the sub-frame 140.

Therefore, the maximum inflection of the side member 20 and the sub-frame 140 occurs at a nearby position, and energy absorption efficiency may be maximized.

According to the front vehicle body structure according to various exemplary embodiments of the present disclosure, impact absorption performance in a collision may be improved through deformation optimization of the front side member 20, and the absorption of impact energy may be increased by inducing deformation at two points of the front side member 20.

Furthermore, according to the front vehicle body structure according to various exemplary embodiments of the present disclosure, the collision behavior may be stabilized by matching the bending points of the side member and the sub-frame.

For convenience in explanation and accurate definition in the appended claims, the terms “upper”, “lower”, “inner”, “outer”, “up”, “down”, “upwards”, “downwards”, “front”, “rear”, “back”, “inside”, “outside”, “inwardly”, “outwardly”, “interior”, “exterior”, “internal”, “external”, “forwards”, and “backwards” are used to describe features of the exemplary embodiments with reference to the positions of such features as displayed in the figures. It will be further understood that the term “connect” or its derivatives refer both to direct and indirect connection.

The term “and/or” may include a combination of a plurality of related listed items or any of a plurality of related listed items. For example, “A and/or B” includes all three cases such as “A”, “B”, and “A and B”.

In the present specification, unless stated otherwise, a singular expression includes a plural expression unless the context clearly indicates otherwise.

In exemplary embodiments of the present disclosure, “at least one of A and B” may refer to “at least one of A or B” or “at least one of combinations of at least one of A and B”. Furthermore, “one or more of A and B” may refer to “one or more of A or B” or “one or more of combinations of one or more of A and B”.

In the present specification, a singular expression includes the plural form unless the context clearly dictates otherwise.

In the exemplary embodiment of the present disclosure, it should be understood that a term such as “include” or “have” is directed to designate that the features, numbers, steps, operations, elements, parts, or combinations thereof described in the specification are present, and does not preclude the possibility of addition or presence of one or more other features, numbers, steps, operations, elements, parts, or combinations thereof.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A front vehicle body structure comprising:

a side member disposed on a front of a vehicle body;

a lower reinforcement member, a portion of which is provided inside the side member;

a joint bulk head provided inside the side member and connected to a front of the lower reinforcement member;

a sub-frame front mounting portion and a sub-frame rear mounting portion, respectively formed on front and rear of the side member; and wherein the lower reinforcement member extends from a vicinity of a center position between the sub-frame front mounting portion and the sub-frame rear mounting portion to a rear of the vehicle body.

2. The front vehicle body structure of claim 1, further including a rear lower member connecting the rear of the side member and a side sill.

3. The front vehicle body structure of claim 2, wherein the lower reinforcement member extends to the side sill.

4. The front vehicle body structure of claim 3, wherein the lower reinforcement member covers a dash panel.

5. The front vehicle body structure of claim 2, wherein the lower reinforcement member is connected to a bottom surface of the side member and a bottom surface of the rear lower member.

6. The front vehicle body structure of claim 2, wherein the rear lower member connects the side member and the side sill in an oblique direction of the vehicle body.

7. The front vehicle body structure of claim 2, further including a side reinforcement bulk head provided inside the side member and connected to the joint bulk head.

8. The front vehicle body structure of claim 7, wherein the joint bulk head includes:

a joint bulk head lower flange connected to the lower reinforcement member;

a joint bulk head upper flange connected to the side member; and a joint bulk head side flange formed between the joint bulk head lower flange and the joint bulk head upper flange.

9. The front vehicle body structure of claim 8, wherein the side reinforcement bulk head includes:

a side reinforcement bulk head side flange connected to the side member; and a side reinforcement bulk head connecting flange connected to the side member and the joint bulk head side flange.

10. The front vehicle body structure of claim 9, wherein the side reinforcement bulk head side flange is connected between the side reinforcement bulk head connecting flange, the side member and the joint bulk head side flange to increase strength of the side member.

11. The front vehicle body structure of claim 7, wherein a section between the front of the side member and a portion provided with the side reinforcement bulk head form a collapsing deformation zone collapsed in response that a vehicle collides.

12. The front vehicle body structure of claim 7, wherein a front of the side reinforcement bulk head and a rear of the joint bulk head form a first bending section and a second bending section, respectively, which are bent in response that a vehicle collides.

13. The front vehicle body structure of claim 2, wherein the sub-frame rear mounting portion includes:

a sub-frame rear mounting portion bracket connected to the rear lower member; and a sub-frame rear mounting bolt provided through the sub-frame rear mounting portion bracket, the rear lower member and the lower reinforcement member.

14. The front vehicle body structure of claim 13, wherein the sub-frame rear mounting portion further includes a sub-frame rear mounting reinforcement connecting the sub-frame rear mounting portion bracket, the rear lower member and a front floor of the vehicle body.

15. The front vehicle body structure of claim 2, further including a side rear bulk head provided adjacent to a connection portion between the side member and the rear lower member.

16. The front vehicle body structure of claim 1, wherein the sub-frame front mounting portion includes:

a front mounting bracket;

a front side member bracket connecting the front mounting bracket and the side member; and a front side member bulk head provided within the front side member bracket.

17. The front vehicle body structure of claim 1, wherein the side member includes a side member internal panel and a side member external panel connected to the side member internal panel, and wherein the lower reinforcement member and the joint bulk head are mounted inside the side member internal panel and the side member external panel.

18. The front vehicle body structure of claim 1, wherein the lower reinforcement member is mounted on a rear of the side member at a position where the joint bulk head is mounted.

* * * * *